N. STRAUSSLER

Sept. 22, 1931. FOLDING VEHICLE Re. 18,203

Original Filed March 28, 1929 2 Sheets-Sheet 1

Inventor:
Nicholas Strausser
By
Rennie Davis Marvin + Edmonds
attorneys

N. STRAUSSLER

Sept. 22, 1931. FOLDING VEHICLE Re. 18,203

Original Filed March 28, 1929 2 Sheets-Sheet 2

INVENTOR
Nicholas Straussler
BY
Dennis Davis Harris & Edmunds
ATTORNEYS

Reissued Sept. 22, 1931 Re. 18,203

UNITED STATES PATENT OFFICE

NICHOLAS STRAUSSLER, OF LONDON, ENGLAND

FOLDING VEHICLE

Original No. 1,739,269, dated December 10, 1929, Serial No. 350,518, filed March 28, 1929, and in Great Britain February 13, 1928. Application for reissue filed June 16, 1930. Serial No. 461,661.

This invention relates to folding vehicles and is applicable to boats, perambulators, cycle side-cars, and similar vehicles, of the kind in which the floor of the vehicle has one end curving inwardly at both sides towards the centre line or major axis and the other end truncated or squared, that is, formed at right angles to the said major axis, the side walls of the vehicle being continuously joined to the floor and following its contour, so that they can both be laid flat on the floor, while the stern or rear wall is similarly jointed at the lower edge to the floor.

According to this invention the lower edges of the side walls extend to the square end of the floor panel, and their top edges end some distance away from the top corners of the rear wall, stern or back-board, the gaps being triangular in shape, and trianglar jointing pieces which may be of the same material as the floor and walls, extend between the sides of the undivided rear wall and the inclined portions of the side walls, so that when erected they constitute portions of the side walls. The back-board can thus be conveniently laid down over the rear ends of the two side walls and over the triangular jointing pieces.

The vehicle may be constructed of material which possesses sufficient flexibility to enable the side walls to be bent at the front portion and the floor to rise in a curve corresponding with the curvature thus imposed on the side walls. This material may be plywood, with or without a coating of thin galvanized metal applied internally or externally, or both. The walls may be jointed to the floor by webbing treated with waterproof glue, or by other suitable material.

In order that the said invention may be clearly understood and readily carried into effect, the same will now be described more fully with reference to the accompanying drawings exemplifying the application of the invention to boats.

A indicates the flat bottom of the boat, B, C the side walls, D the stern connected with the side walls by triangular jointing pieces E, F. G indicates a grating which can be placed across the boat bottom, H a hinge to which a rear seat (not shown), may be attached, J a hinge for the attachment of a front seat (not shown), K an eye through which any suitable hook may be passed to facilitate the lifting of the front end of the boat bottom in opening out the boat; M and N indicate U shaped clips for securing the ends of a pair of sculls which may be laid longitudinally of the boat when it is folded for storage or transport. W indicates the webbing which forms the joints between the relatively movable parts.

Figure 1:
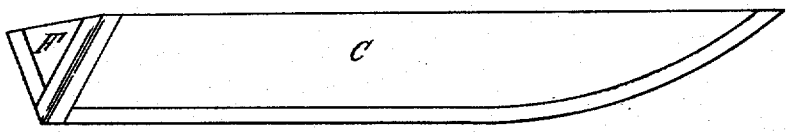
Figure 1 is a side elevation.
Figure 2:
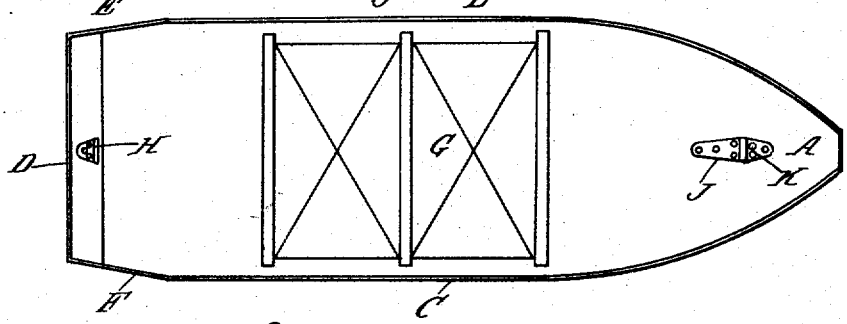
Figure 2 is a plan of a boat opened out for use.
Figure 3:
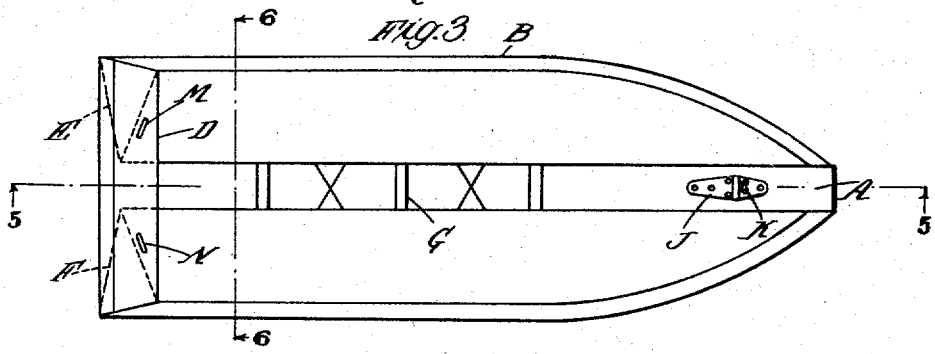
Figure 3 is a plan of the same boat collapsed.

The rear wall or stern D is preferably narrower at its free upper edge than at its lower or jointed edge; when erected it may be vertical, or may be set to lean back. The lower or bottom edges of the side walls B, C extend to the square end of the floor panel A, whereas the top edges end some distance away from the top corner of the rear wall D, the gaps being triangular in shape. The triangular jointing pieces E, F which may be of the same material as the floor and walls, extend between the sides of the rear wall on the one hand and inclined portions of the side walls on the other hand, so that when erected they continue the lines of the tops of the side walls to their junction with the upper corners or other parts of the rear walls, or may as illustrated in Figure 1 be slightly inclined downwards toward the stern.

Figure 4:
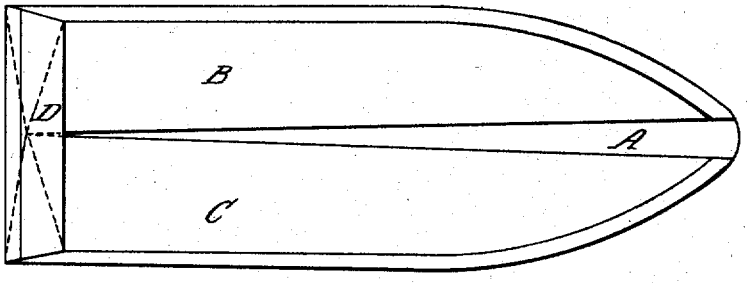
Figure 4 is a plan illustrating a modification.
Figure 5:
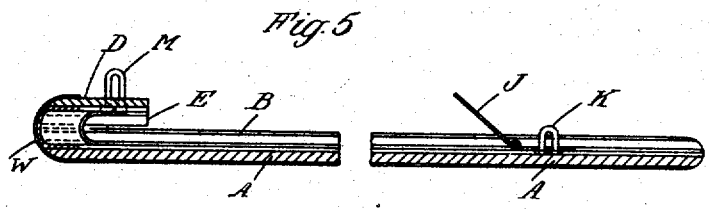
Figure 5 is a longitudinal section on a large scale taken on the line 5—5 of Figure 3.
Figure 6:
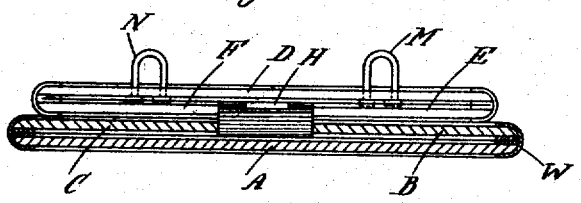
Figure 6 is a cross section taken on the line 6—6 of Figure 3.

In order to avoid the presence of a sharp point at the front of the vehicle, the gunwale or elbow rest in the case of a boat for example may be slightly inclined downwards towards the front, so that the side walls while rising to the full height of the back wall leave a gap when laid down, as seen in Figure 4, and the floor may be rounded or truncated at this part.

A vehicle body thus constructed can readily be collapsed into a flat condition for storage or transit, and can readily be opened out when required for use.

What I claim and desire to secure by Letters Patent of the United States is:—

1. In a folding vehicle, a floor having one end curved inwardly at both sides towards the major axial line of said floor, the other end of said floor being straight and at right angles to the said major axial line, side walls continuously jointed to the sides of the said floor and following its contour throughout its length, said side walls being shorter at their upper edges than at their lower edges and being adapted to be turned down over the floor and laid flat thereon with their normally upper edges towards the major axial line of the floor, an undivided rear wall continuously jointed at its lower edge to the straight end of the floor and adapted to be turned down over the outsides of the side walls when the latter are folded, and two triangular portions each jointed at one side to one side of the rear wall, said portions being each jointed at their forwardly inclined side to an inclined edge of one of the side walls, whereby in collapsing the vehicle said triangular portions are caused to lie between the rear wall and the side walls.

2. In a folding vehicle, a longitudinally continuous floor member having curved lateral edges at one end and square at its opposite end, lateral members adapted to lie over and substantially parallel to said floor member, each of said lateral members having its edge contiguous to the edge of said floor member of substantially the same contour as said floor member, means flexibly connecting each of said lateral members to said floor member and enabling said lateral members to be moved into a position substantially at right angles to said floor member, said lateral members in said last named position flexing the curved end of said floor member, and a rear member flexibly connected to the square end of said floor member and to said lateral members and foldable inwardly over the same.

3. In a folding vehicle, a longitudinally continuous floor member having curved lateral edges at one end and square at its opposite end, lateral members adapted to lie over and substantially parallel to said floor member, means flexibly connecting each of said lateral members to said floor member and extending throughout the length of the contiguous edges of said lateral and floor members, said lateral members being movable into a position substantially at right angles to said floor member and flexing the curved end of said floor member in said position, and a rear member flexibly connected to the square end of said floor member and to said lateral members and foldable inwardly over the same.

4. In a folding vehicle, a longitudinally continuous floor member having its lateral edges tapered at one end and truncated at its opposite end, lateral members adapted to lie over and substantially parallel to said floor member and having their edges contiguous to the edges of said floor member of substantially the same contour as said floor member, means flexibly connecting each of said lateral members to said floor member and enabling said lateral members to be moved into a position substantially at right angles to said floor member, and a rear member flexibly connected with the truncated end of said floor member and to said lateral members and foldable over the same.

5. In a folding vehicle, a longitudinally continuous floor member tapered at one end and truncated at its opposite end, lateral members adapted to lie substantially parallel to said floor member, means extending throughout the length of the contiguous edges of said floor and lateral members to flexibly connect said lateral members to said floor member and enabling said lateral members to be moved into a position substantially at right angles to said floor member, and a rear member flexibly connected to the truncated end of said floor member and to said lateral members and foldable over the same.

6. In a folding vehicle, a floor member tapered at one end and truncated at its opposite end, lateral members adapted to lie substantially parallel to said floor member, said floor and lateral members being longitudinally continuous and relatively rigid but adapted to be bent into curves, means flexibly connecting each of said lateral members to said floor member and enabling said lateral members to be moved into a position substantially at right angles to said floor member, and a rear member flexibly connected to the truncated end of said floor member and to said lateral members and foldable over the same.

7. In a folding vehicle, a floor member tapered at one end and truncated at its opposite end, lateral members adapted to lie substantially parallel to said floor member, said floor and lateral members being longitudinally continuous and relatively rigid but adapted to be bent into curves, said lateral members having their edges contiguous to the edges of said floor member of substantially the same contour as said floor member, means flexibly connecting each of said lateral members to said floor member and enabling said lateral members to be moved into a position substantially at right angles to said floor member, and a rear member flexibly connected to the truncated end of said floor member and having jointed connections therewith said lateral members foldable between said floor and rear members.

8. In a folding vehicle, a floor member tapered at one end and truncated at its opposite end, lateral members adapted to lie substantially parallel to said floor member, said floor and lateral members being longitudinally continuous and relatively rigid but adapted to be bent into curves, means flexibly connecting each of said lateral members to said floor member and extending throughout the length of the contiguous edges of said floor member and lateral members, said flexible connecting means enabling said lateral members to be moved into a position substantially at right angles to said floor member, a rear member flexibly connected to the truncated end of said floor member and jointed connections between said rear member and said lateral members foldable under said rear member.

9. In a folding vehicle, a longitudinally continuous floor member tapered at one end and truncated at its opposite end, lateral members adapted to lie substantially parallel to said floor member, means flexibly connecting each of said lateral members to said floor member and enabling said lateral members to be moved into a position substantially at right angles to said floor member, said lateral and floor members having curved contiguous edges whereby said members are concavely flexed when said members are moved into said position substantially at right angles to each other, and a rear member flexibly connected to the truncated end of said floor member and to said lateral members and foldable over the same.

10. In a folding vehicle, a longitudinally continuous floor member tapered at one end and truncated at its opposite end, lateral members adapted to lie substantially parallel to said floor member and having their edges contiguous to the edges of said floor member of substantially the same contour as said floor member, means flexibly connecting each of said lateral members to said floor member and extending throughout the length of the contiguous edges of said members, said flexible connecting means enabling said lateral members to be moved into a position substantially at right angles to said floor member, and a rear member flexibly connected to the truncated end of said floor member and to said lateral members and foldable over the same.

11. In a folding vehicle, a longitudinally continuous floor member tapered at one end and truncated at its opposite end, lateral members adapted to lie substantially parallel to said floor member and having their edges contiguous to the edges of said floor member of substantially the same contour as said floor member, means flexibly connecting each of said lateral members to said floor member and extending throughout the length of the contiguous edges of said members, said flexible connecting means enabling said lateral members to be moved into a position substantially at right angles to said floor member, and a rear member adapted to lie over and substantially parallel to said floor member and lateral members and flexibly connected to the truncated end of said floor member and to said lateral members.

12. In a folding vehicle, a floor member tapered at one end and truncated at its opposite end, lateral members adapted to lie substantially parallel to said floor member and having their edges contiguous to the edges of said floor member of substantially the same contour as said floor member, means flexibly connecting each of said lateral members to said floor member and extending throughout the length of the contiguous edges of said members, said flexible connecting means enabling said lateral members to be moved into a position substantially at right angles to said floor member, a rear member adapted to overlie said lateral members substantially parallel thereto, flexible connecting means between said rear member and said floor member, and means connecting and foldable between said lateral members and said rear member.

13. In a folding vehicle, a floor member tapered at one end and truncated at its opposite end, lateral members adapted to lie substantially parallel to said floor member and having their edges contiguius to the edges of said floor member of substantially the same contour as said floor member, means flexibly connecting each of said lateral members to said floor member and extending throughout the length of the contiguous edges of said members, said flexible connecting means enabling said lateral members to be moved into a position substantially at right angles to said floor member, said lateral members at their edges opposite to said contiguous edges being shorter than said floor member, a rear member flexibly connected to the truncated end of said floor member, and triangular members interposed between said rear and lateral members and flexibly connected to each.

14. In a folding vehicle, a floor member tapered at one end and truncated at its opposite end, lateral members adapted to lie substantially parallel to said floor member and having their edges contiguous to the edges of said floor member of substantially the same contour as said floor member, means flexibly connecting said lateral members to said floor member and extending throughout the length of the contiguous edges of said members, said flexible connecting means enabling said lateral members to be moved into a position substantially at right angles to said floor member, said lateral members having their edges remote from said floor member shorter than their edges contiguous to said floor member, triangular members flexibly connected to said lateral members and adapted to fold thereon, and a rear member flexibly connected to said triangular members and adapted to fold thereon, said rear member being flexibly connected to said floor member.

15. In a folding vehicle, a floor member tapered at one end and truncated at its opposite end, lateral members adapted to lie substantially parallel to said floor member and having their edges contiguous to the edges of said floor member of substantially the same contour as said floor member, means flexibly connecting said lateral members to said floor member and extending throughout the length of the contiguous edges of said member, said flexible connecting means enabling said lateral members to be moved into a position substantially at right angles to said floor member, said lateral members each having a section adjacent the truncated end of said floor member which is flexibly connected to the lateral member and foldable with respect thereto, and a rear member flexibly connected to the truncated end of said floor member and to each of said foldable extensions of said lateral members.

16. In a folding vehicle, a floor member and lateral members adapted to lie substantially parallel, said floor and lateral members having contiguous edges of like contour and flexibly connected, said flexible connection permitting said lateral members to be moved to a position in which said floor and lateral members react on each other to flex said floor member, and a rear member flexibly connected to the end of said floor member and to said lateral members and adapted to be folded over the same.

17. In a folding vehicle, a floor member and lateral members adapted to lie substantially parallel, said members being composed of material which is approximately rigid but bendable into curves in the direction of the length of said members, said floor and lateral members having contiguous edges of like contour and flexibly connected, said flexible connection permitting said lateral members to be moved to a position in which said floor and lateral members react on each other to flex said members, and a rear member flexibly connected to the end of said floor member and to said lateral members and adapted to be folded over the same.

18. In a folding vehicle, a longitudinally continuous floor member tapered at one end and truncated at its opposite end, lateral members flexibly connected to said floor member and adapted to be folded into parallel relation thereto, a rear member flexibly connected to the truncated end of said floor member and adapted to be folded over and into parallel relation thereto, and foldable extensions on said lateral members forming a watertight connection between said rear and lateral members when said rear and lateral members are moved into positions substantially at right angles to said floor member.

19. In a folding vehicle, a longitudinally continuous floor member tapered at one end and truncated at its oposite end, lateral members flexibly connected to said floor member and adapted to be folded into parallel relation thereto, a rear member flexibly connected to the truncated end of said floor member and adapted to be folded into parallel relation thereto, said rear member being foldable on top of said lateral members, and connecting members between said rear and lateral members which form a part of the lateral wall of the structure when said members are moved into a position substantially at right angles to said floor member.

20. In a folding vehicle, a longitudinally continuous floor member tapered at one end and truncated at its opposite end, lateral members flexibly connected to said floor member and adapted to be folded into parallel relation thereto, a rear member flexibly connected to the truncated end of said floor member and adapted to be folded into parallel relation thereto, and triangular-shaped members flexibly connected to said rear member and said lateral members and constituting extensions of said lateral members when said rear and lateral members are moved into positions substantially at right angles to said floor member.

In testimony whereof I have signed this specification.

NICHOLAS STRAUSSLER.